(12) United States Patent
Downs

(10) Patent No.: US 6,244,574 B1
(45) Date of Patent: Jun. 12, 2001

(54) DUAL DIFFUSER ASSEMBLY

(75) Inventor: Ernest W. Downs, Cincinnati, OH (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/622,384

(22) PCT Filed: Mar. 2, 1999

(86) PCT No.: PCT/US99/04614

§ 371 Date: Aug. 16, 2000

§ 102(e) Date: Aug. 16, 2000

(87) PCT Pub. No.: WO99/44730

PCT Pub. Date: Sep. 10, 1999

Related U.S. Application Data
(60) Provisional application No. 60/076,467, filed on Mar. 2, 1998.

(51) Int. Cl.[7] .............................................. B01F 3/04
(52) U.S. Cl. ................................ 261/122.1; 261/DIG. 70
(58) Field of Search ........................... 261/122.1, 122.2, 261/DIG. 47, DIG. 70; 210/220, 221.1, 221.2

(56) References Cited

U.S. PATENT DOCUMENTS

| | | | | |
|---|---|---|---|---|
| 3,083,953 | * | 4/1963 | Langdon et al. | 261/122.1 |
| 3,644,231 | * | 2/1972 | Maruya et al. | 261/122.1 |
| 3,837,629 | * | 9/1974 | Matras et al. | 261/122.1 |
| 3,953,553 | * | 4/1976 | Thayer | 261/122.1 |
| 3,954,922 | * | 5/1976 | Walker | 261/DIG. 47 |
| 4,192,255 | * | 3/1980 | Willinger | 261/122.1 |

* cited by examiner

Primary Examiner—C. Scott Bushey
(74) Attorney, Agent, or Firm—Michael Best & Friedrich LLP

(57) ABSTRACT

The dual diffuser assembly of the present invention includes a first and second diffuser body in fluid communication with an air distribution pipe. The diffuser assembly further includes a saddle that connects the first diffuser body and the second diffuser body to the air distribution pipe. The air received from the distribution pipe passes into the first and second diffuser bodies and exits the first diffuser body through a first diffuser and exits the second diffuser body through a second diffuser. The first and second diffusers form the air into fine bubbles that serve to facilitate aeration of the medium.

25 Claims, 5 Drawing Sheets

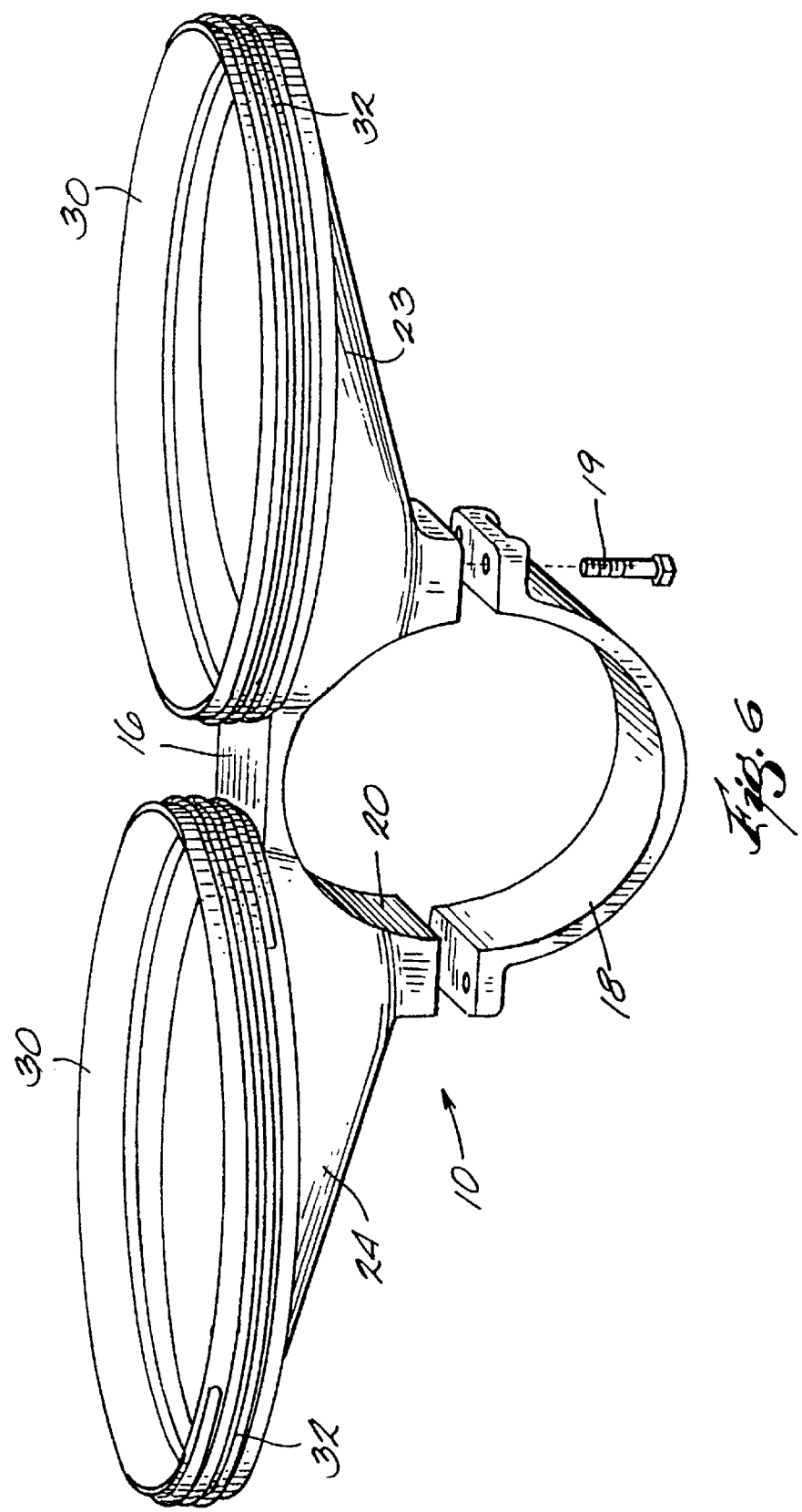

DUAL DIFFUSER ASSEMBLY

This application claims the benefit of domestic priority under 35 U.S.C. 119(e) to provisional application Ser. No. 60/076,467, filed on Mar. 2, 1998, now abandoned.

This invention relates to a dual diffuser assembly, and more particularly to a dual diffuser assembly for use in aerating wastewater within a wastewater treatment tank.

BACKGROUND OF INVENTION

Diffusers are used in wastewater treatment tanks to introduce oxygen into the wastewater. The wastewater is typically contained in treatment tanks, and air is forced through diffusers to produce fine bubbles that flow through the wastewater. Diffusing a high volume of air or oxygen into the wastewater in the form of fine bubbles facilitates biological growth during the waste treatment process. Supplying air into the treatment tank also serves to prevent sedimentation of the wastewater within the treatment tank. The treatment tank usually includes a network of air distribution piping for transferring air to the diffusers. The network of air distribution piping typically includes a drop pipe extending from an air supply to a manifold that is submerged within the wastewater. The submerged manifold is connected to a plurality of submerged distribution pipes that are also submerged within the wastewater and generally arranged in a parallel configuration along the bottom of the treatment tank. Each distribution pipe typically supports a number of diffusers such that the diffusers are also submerged within the wastewater along the bottom of the tank.

After a period of operation diffusers may become clogged and less efficient such that the diffusers must be cleaned and/or replaced. Cleaning and/or replacing the diffusers is burdensome because the treatment tank must be emptied to perform maintenance on the diffusers.

Conventional diffusers are bolted either directly, or mounted via a base plate, to one of the air distribution pipes. The construction of the diffuser assemblies makes it difficult to perform maintenance on the diffuser assembly. First, the distribution pipe may require machining in order for the diffuser assembly to be mounted thereto. Second, the diffuser assembly may be damaged when torque is applied to the diffuser assembly as the diffuser assembly is being assembled/disassembled. Applying a torque can be especially problematic because diffuser assemblies are usually attached at a single central location and have a limited ability to withstand excessive torque. Finally, common diffuser assemblies are often mounted either underneath or on the sides of the distribution pipe making it more difficult for an individual to access critical portions of the diffuser assembly during maintenance.

A typical diffuser arrangement is disclosed in U.S. Pat. No. 3,083,953. The gas diffusion apparatus includes two diffusers that are located laterally adjacent to a conduit portion. The conduit portion is mounted end-to-end within an air distribution pipe such that some of the air passes through the conduit portion.

Another diffuser is disclosed in U.S. Pat. No. 3,396,950. This patent discloses a diffuser for sewage treatment. The diffuser includes external threads that are used to mount the diffuser to the top of an air distribution pipe.

Another known diffuser is disclosed in U.S. Pat. No. 3,954,922. This patent discloses a diffuser having a header that is mounted underneath a distribution pipe. The header is mounted to the distribution pipe by a hose-type clamp. The header includes an opening that supplies air into a medium through a pair of angular flanges. The flanges extend from underneath the distribution pipe on opposite sides of the distribution pipe.

Another such diffuser is disclosed in U.S. Pat. No. 4,046,845. The disclosed diffuser is secured into the top of an air supply pipe through a base member that has an externally threaded section.

SUMMARY OF THE INVENTION

The present invention is directed to a dual diffuser assembly used for aerating a liquid. The diffuser assembly provides an improved design for attaching the diffuser assembly to an air distribution pipe. A plurality of these diffuser assemblies are able to aerate a large quantity of the medium when the medium is contained within one or more storage tanks. One example of a fluid that could be aerated is wastewater located in a sewage treatment facility.

The dual diffuser assembly includes a first diffuser body and a second diffuser body. Both of the diffuser bodies are mounted in fluid communication with an air distribution pipe. A first diffuser is supported by the first diffuser body and a second diffuser is supported by the second diffuser body. The dual diffuser assembly further includes a saddle that connects the first and second diffuser bodies to the distribution pipe.

During operation of the diffuser assembly air under pressure is forced from the distribution pipe into the diffuser assembly. The air enters the first and second diffuser bodies where the air flows through the first and second diffusers before passing into the medium to be aerated. As the air passes through the first and second diffusers it is formed into fine bubbles and the flow of fine bubbles of air through the medium facilitates aeration of the medium.

The saddle is preferably integral with the first and second diffuser bodies and includes a contoured surface that matches the upper half of the outer surface on the distribution pipe. The saddle of the diffuser assembly extends across the top of the distribution pipe and downwardly along both sides of the distribution pipe approximately to the mid-portion, or widest portion, of the pipe. Thus, the saddle surrounds the entire upper half of the pipe. This configuration provides a large contact area between the saddle and the distribution pipe. A larger contact area between the saddle and the distribution pipe creates a stronger connection when the saddle is secured to the distribution pipe, especially via solvent welding.

In a preferred form of the invention the first diffuser body and the second diffuser body extend outwardly, transversely and upwardly from the distribution pipe. Positioning the diffusers substantially above and away from the distribution pipe provides easy access to the diffuser assembly during service and eliminates interference from the distribution pipe with the fine bubbles that are emitted as the air passes through the diffusers into the medium to be aerated.

In another aspect, the present invention relates to a system for aerating wastewater that comprises an air distribution pipe and a plurality of diffuser assemblies mounted along the air distribution pipe. The diffuser assemblies are adapted to receive air from one or more openings in air distribution pipe.

An object of this invention is to provide a diffuser assembly that is readily mounted onto a distribution pipe. Providing a diffuser assembly that is readily mounted to the distribution pipe minimizes the cost associated with installing, cleaning and/or replacing the diffuser assembly.

Another object of this invention is to provide a diffuser assembly that is capable of being securely connected to a distribution pipe that provides air to the diffuser assembly. A secure connection between the diffuser assembly and the distribution pipe reduces the possibility of damage that may arise when a force, or torque, is applied to the diffuser assembly during maintenance or installation.

Another objective is to provide a diffuser assembly that can be mounted anywhere along the length of a distribution pipe. Increasing the flexibility associated with mounting the diffuser assembly to the distribution pipe simplifies the task of mounting numerous diffuser assemblies along the length of a distribution pipe that is submerged in a treatment tank.

Still another object of the invention is to provide a diffuser assembly that is readily mounted to existing air distribution pipes such that the network of distribution pipes within an existing storage tank can be retro-fitted with new diffuser assemblies.

Other features and advantages of the invention will become apparent to those skilled in the art upon review of the following detailed description, claims and drawings.

BRIEF DESCRIPTION OF THE DRAWING

FIG. 6 is a perspective view of another embodiment of the dual diffuser assembly.

DETAILED DESCRIPTION OF THE PREFERRED EMBODIMENT

Figure 1:
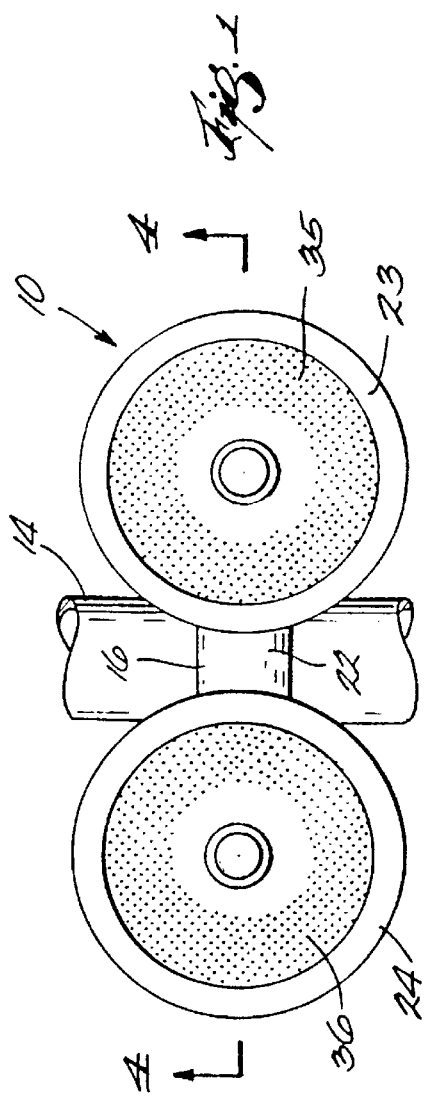
FIG. 1 is an enlarged top plan view of a single dual diffuser assembly mounted on a distribution pipe.
Figure 2:
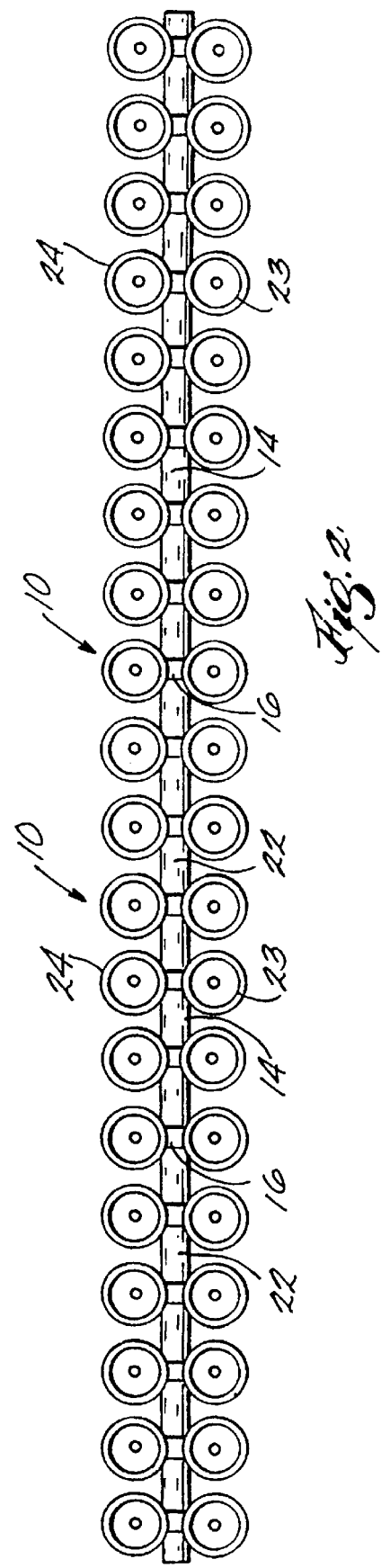
FIG. 2 is a top plan view of a number of dual diffuser assemblies mounted along a single distribution pipe.

FIG. 1 illustrates a top plan view of a dual diffuser assembly 10 of the present invention mounted to a distribution pipe 14. FIG. 2 shows several dual diffuser assemblies 10 mounted to a distribution pipe 14. Mounting several diffuser assemblies 10 along the distribution pipe 14 increases the volume of air that can be diffused into a medium to be aerated.

Figure 3:
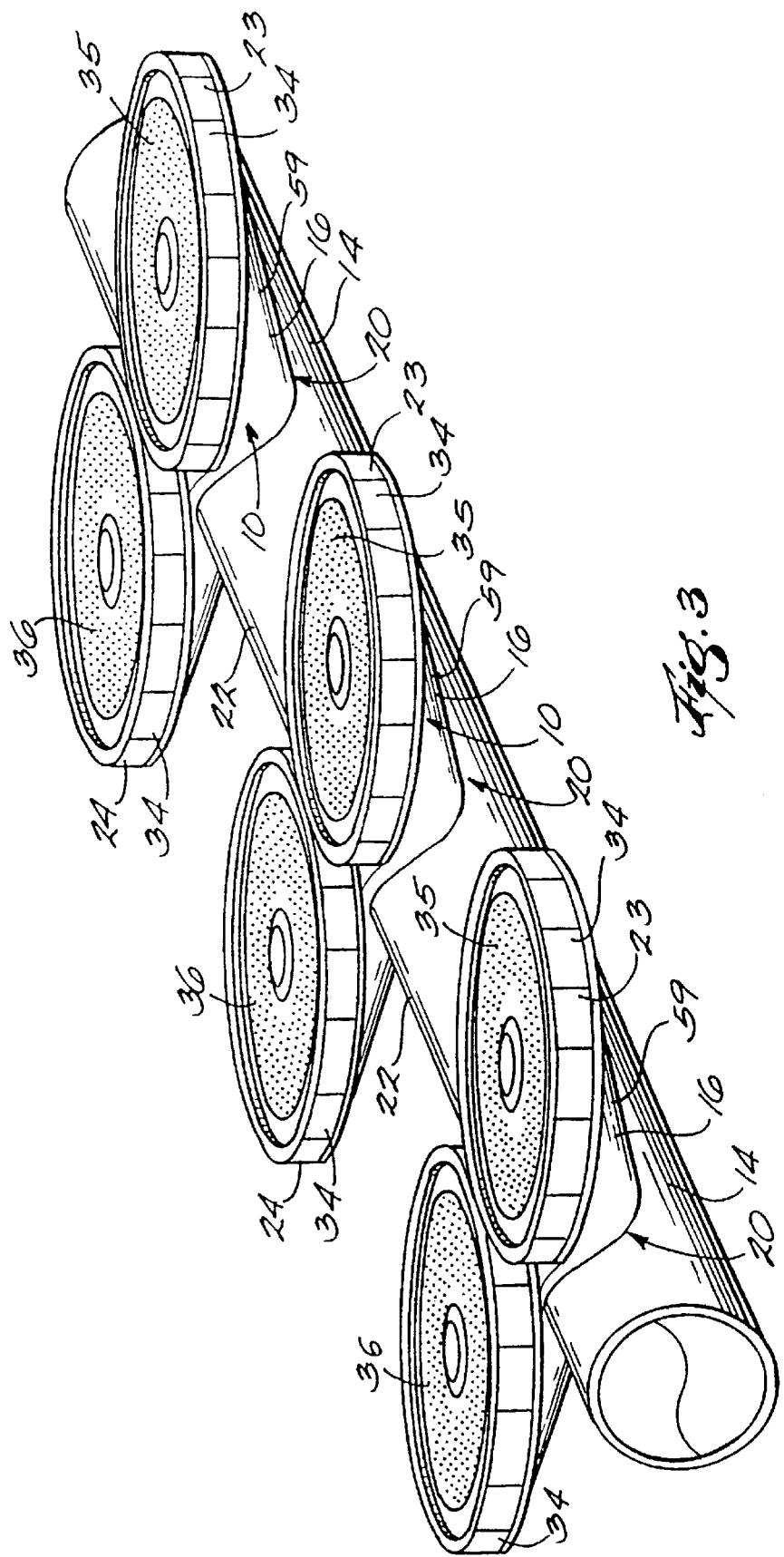
FIG. 3 is a perspective view showing a number of dual diffuser assemblies mounted along a section of a single distribution pipe.
Figure 4:
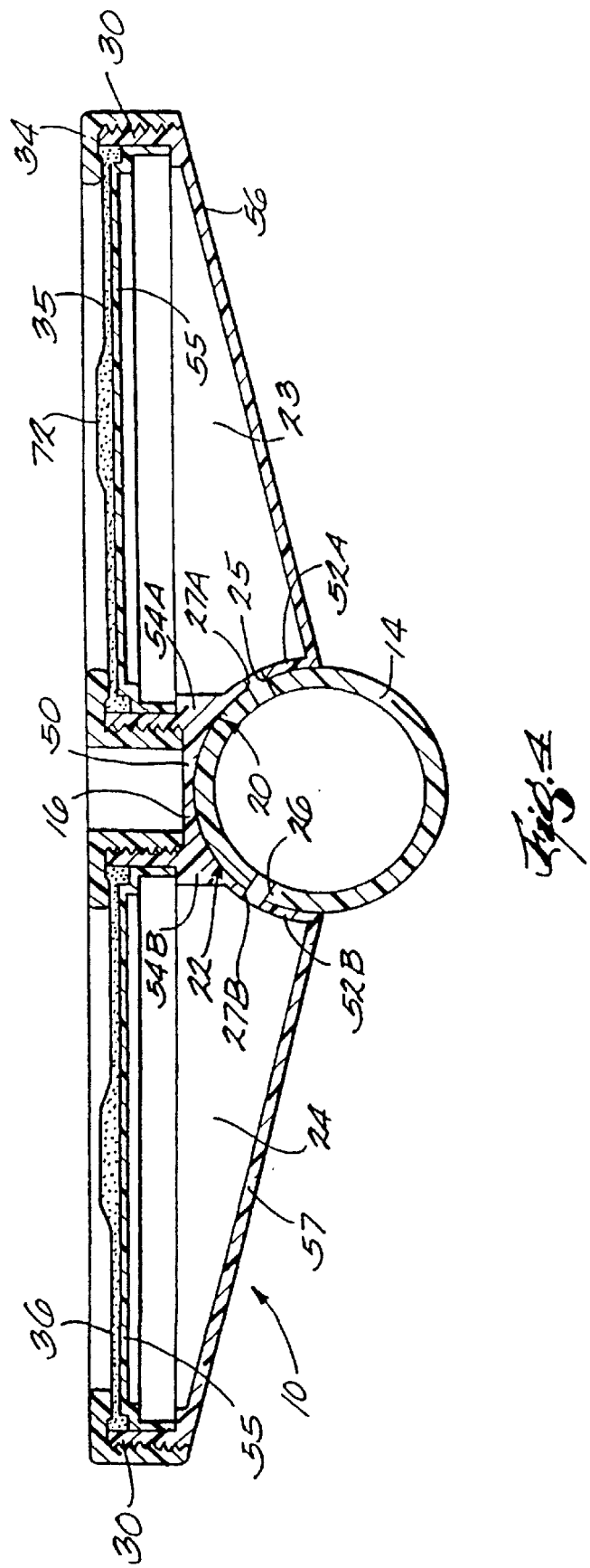
FIG. 4 is a section view of the dual diffuser assembly of FIG. 2 taken through the line 4—4.
Figure 5:
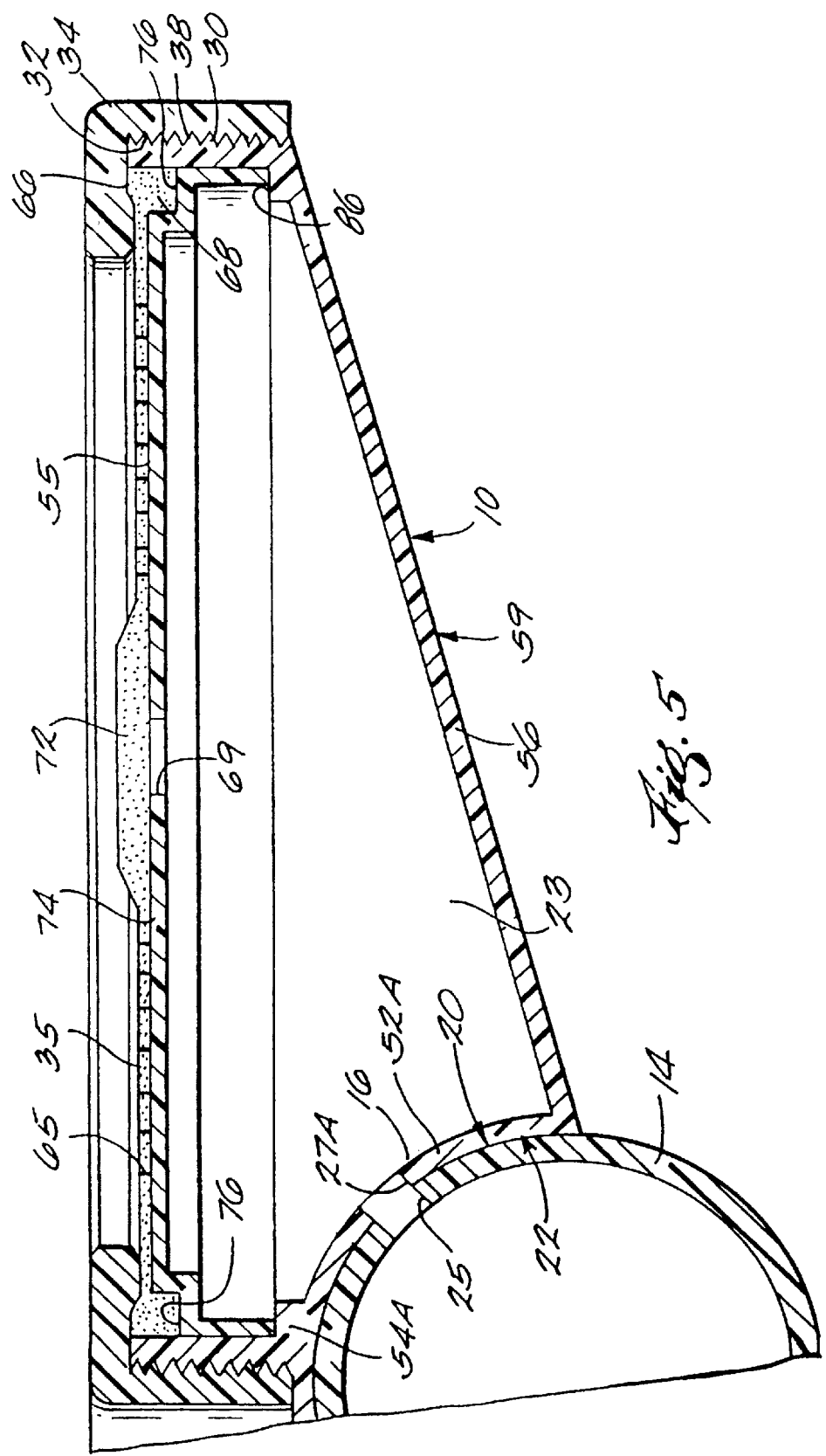
FIG. 5 is a section view, similar to FIG. 4, wherein one of the diffusers is enlarged to illustrate the structure of the dual diffuser assembly in greater detail.

As best illustrated in FIGS. 3–5, the diffuser assembly 10 includes a first diffuser body 23 and a second diffuser body 24. Both of the diffuser bodies 23,24 are mounted in fluid communication with an air distribution pipe 14. A first diffuser 35 is supported by the first diffuser body 23 and a second diffuser 36 is supported by the second diffuser body 24. The dual diffuser assembly 10 further includes a saddle 16 that connects the first and second diffuser bodies 23,24 to the distribution pipe 14. The saddle 16 is preferably integral with the first and second diffuser bodies 23,24 and includes a contoured surface 20 that matches the upper half of the outer surface on the distribution pipe 14. In addition, the saddle 16 of the diffuser assembly 10 extends across the top of the distribution pipe 14 and downwardly along both sides of the distribution pipe 14 approximately to the mid-portion, or widest portion, of the distribution pipe 14. Thus, the saddle 16 preferably surrounds the entire upper half of the distribution pipe 14. As illustrated in FIGS. 3–5, the first diffuser body 23 and the second diffuser body 24 preferably extend outwardly, transversely and upwardly from the distribution pipe 14.

In operation of the diffuser assembly 10, air under pressure flows into the first diffuser body 23 through a first opening 25 and into the second diffuser body 24 through a second opening 26. The air flowing into the first diffuser body 23 exits the first diffuser body 23 through a first diffuser 35 into the medium to be aerated. Similarly, the air flowing into the second diffuser body 24 exits the second diffuser body 24 through a second diffuser 36. As the air passes through the first diffuser 35 and the second diffuser 36, the air is transformed into fine bubbles that aerate the medium. Although the diffusers could be positioned in other orientations, the first diffuser 35 and the second diffuser 36 are preferably oriented horizontally such that the diffused air flows into the medium in a substantially vertical orientation. The first diffuser 35 and the second diffuser 36 are preferably flexible membranes as more clearly defined in U.S. Pat. Nos. 3,997,634 and 5,530,688, which are incorporated herein by reference, although ceramic diffusers that are commonly known in the art may also be used.

In the embodiment illustrated in FIGS. 1–5, the contoured surface 20 of the saddle 16 is semi-cylindrical in order to facilitate fitting existing distribution pipes with the diffuser assembly 10. The contoured surface 20 provides a greater contact area between the distribution pipe 14 and the diffuser assembly 10. This greater contact area also facilitates bonding between the diffuser assembly 10 and the distribution pipe 14 by solvent welding, thermal welding, mechanical attachment and/or by using adhesives.

One preferred means for attaching the diffuser assembly 10 to the distribution pipe 14 is by using one or more hollow rivets (not shown). The hollow rivets extend through the openings 27A,27B in the distribution pipe 14 and the first and second openings 25,26 in the diffuser assembly 10. The hollow rivets provide an air flow channel from the distribution pipe 14 into the diffuser assembly 10 and prevent any of the air from leaking between distribution pipe 14 and the diffuser assembly 10.

The diffuser assembly 10 can be mounted to a heavy gauge plastic distribution pipe or even a metal distribution pipe. The design of the diffuser assembly 10 also permits it to be mounted at any position along the length of the distribution pipe 14, merely by drilling holes in the distribution pipe 14 at selected locations.

In a preferred form of the invention, the saddle 16 includes a main connecting section 50 that connects thin walled sections 52A,52B that are adapted to be positioned on substantially opposite lateral sides of the distribution pipe 14. The main connecting portion 50 includes a pair of thicker sections 54A,54B that are adapted to be positioned near the top of the distribution pipe 14 on opposite sides. The thin walled sections 52A,52B are preferably integral with thicker sections 54A,54B. Each thin walled section 52A,52B includes an opening 27A,27B that is aligned with the openings 25,26 in the distribution pipe 14. The openings 27A,27B also match the size and shape of the first opening 25 and the second opening 26.

As best shown in FIG. 5, the upper portions of the first diffuser body 23 and the second diffuser body 24 (not shown in FIG. 5) each include a circular wall 30 having external threads 32 that are adapted to engage with corresponding internal threads 38 on a retaining ring 34. The first diffuser membrane 35 is secured in place as the retaining ring 34 is screwed onto the circular wall 30. A portion of the circular wall 30 is preferably integral with the thicker section 54A such that the circular wall 30 extends substantially vertically upwardly from the thicker section 54A.

As shown most clearly in FIG. 3, the remainder of the circular wall 30 is integral with a lower wall 56 on the first diffuser body 23. The lower wall 56 includes a bottom surface 59 that is contiguous with that portion of the bottom of the circular wall 30 that is not integral with the thicker section 54A of the saddle 16. The bottom surface 59 of the lower wall 56 is rounded, and extends upwardly and transversely from the lateral midpoint of the distribution pipe 14. The second diffuser body 24 has a similar lower wall 57 (see FIG. 4). Locating the circular walls 30 in this manner positions the diffusers 35,36 outwardly, upwardly and transversely from the distribution pipe 14. The bottom wall 56 of the first diffuser body 23 is integral with the thin walled section 52A of the saddle 16, and the bottom wall 57 of the second diffuser body 24 is integral with the thin walled section 52B of the saddle 16.

In another form of the invention the peripheral edge of the diffusers may include an upwardly extending annular rib 66 and a downwardly projecting annular rib 68. The downwardly extending rib 68 is positioned over a support plate 55 contained within each diffuser body. The upwardly extending rib 66 provides structural stability to each diffuser by bearing against the retaining ring 34 when retaining rings 34 are used to secure the diffusers within the diffuser bodies. The support plate 55 comprises a slightly domed support member 74 having an L-shaped peripheral shoulder 76 that receives the downwardly extending annular rib 68 on the diffuser. The support member 74 includes an opening 69 that the air passes through before exiting through the diffusers into the medium. In the illustrated form of the invention the first diffuser body 23 and the second diffuser body 24 include an annular shoulder 86 upon which the support plate 55 rests. As disclosed in earlier diffuser designs, a thicker, upraised portion 72 may be provided to give additional structural stability to the diffusers. In addition, the diffuser may include a plurality of slots 65 arranged as a series of concentric circles.

Another embodiment of the present invention is shown in FIG. 6. In this embodiment, the saddle 16 further includes a clamping member 18 which extends around the bottom surface of the distribution pipe. The clamping member 18 is adapted to secure the saddle 16 to the distribution pipe 14. The clamping member 18 is preferably contiguous with the bottom surface of the distribution pipe 14 and is secured to the saddle 16 by any conventional means including, but not limited to, the fastener 19. This embodiment may also include one or more O-rings (not shown) that are compressed between the diffuser assembly 10 and the distribution pipe 14. The openings in the O-rings match the openings the diffuser assembly 10 and the distribution pipe 14 such that air flows from the distribution pipe 14 into the diffuser assembly 10 through the O-rings. The O-rings act as a seal and prevent any air from escaping between the diffuser assembly 10 and the distribution pipe 14. The openings in the diffuser assembly 10 and/or the distribution pipe 14 may be recessed such that the O-rings fit within the recesses. Recessing the openings permits the saddle 16 to be in surface contact with the distribution pipe 14 when O-rings are used.

The foregoing description of the present invention has been presented for purposes of illustration and description. Furthermore, the description is not intended to limit the invention to the form disclosed herein. Consequently, variances and modifications commensurate with the above teachings, and the skill or knowledge of the relevant art, are within the scope of the present invention. The embodiments described herein are intended to explain the best mode for practicing the invention and to enable others skilled in the art to utilize the invention in such, or other, embodiments and with various modifications required by the particular applications or uses of the present invention. It is intended that the appended claims be construed to included alternative embodiments to the extent permitted by the prior art.

What is claimed is:

1. A dual diffuser assembly for diffusing a fluid received from distribution pipe into a medium in order to aerate the medium, said diffuser assembly comprising:
    a first diffuser body in fluid communication with the distribution pipe,
    a second diffuser body in fluid communication with the distribution pipe,
    a first diffuser supported by said first diffuser body such that the fluid flows from the distribution pipe into said first diffuser body and through said first diffuser into the medium,
    a second diffuser supported by said second diffuser body such that the fluid flows from the distribution pipe into said second diffuser body and through said second diffuser into the medium, and
    a saddle connecting said first diffuser body and said second diffuser body to the distribution pipe, wherein the distribution pipe includes an outer surface and said saddle includes a contoured surface having a shape complementary to the outer surface of the distribution pipe such that said saddle mates with substantially half of the outer surface on the distribution pipe.

2. The diffuser assembly according to claim 1 wherein said saddle is integral with said first diffuser body and said second diffuser body.

3. The diffuser assembly according to claim 1 wherein said first diffuser body extends transversely from the distribution pipe.

4. The diffuser assembly according to claim 3 wherein said second diffuser body extends transversely from the distribution pipe.

5. The diffuser assembly according to claim 4 wherein said first diffuser body and said second diffuser body extend upwardly from the distribution pipe.

6. The diffuser assembly according to claim 1 further comprising a first retaining ring and a second retaining ring, said first diffuser being secured between said first diffuser body and said first retaining ring and said second diffuser being secured between said second diffuser body and said second retaining ring.

7. The diffuser assembly according to claim 6 wherein said first diffuser body and said second diffuser body each include a circular wall having external threads and each of said retaining rings includes an annular wall having internal threads, each of said internal threads on said retaining rings engaging corresponding said external threads on each of said diffuser bodies.

8. The diffuser assembly according to claim 1 wherein said first diffuser and said second diffuser are substantially horizontal such that the fluid flows substantially vertically as the fluid passes through each of said diffusers.

9. The diffuser assembly according to claim 1 wherein said first and second diffusers are circular.

10. The diffuser assembly according to claim 9 wherein the half of the distribution pipe is an upper-half of the distribution pipe.

11. The diffuser assembly according to claim 10 further comprising a clamping member secured to said saddle, wherein the distribution pipe includes a lower-half and said clamping member is adapted to be contiguous with substantially the lower-half of the distribution pipe.

12. The diffuser assembly according to claim 1 wherein said first diffuser body and said second diffuser body each include an annular shoulder, and said first diffuser and said second diffuser each include an upwardly extending annular rib and a downwardly extending annular rib, and further comprising:
   a first support plate disposed on said annular shoulder of said first diffuser body and a second support plate disposed on said annular shoulder of said second diffuser body, each of said support plates having a peripheral shoulder adapted to receive said downwardly extending annular ribs of said diffusers,
   a first retaining ring mounted about said first diffuser body, wherein said first retaining ring secures said first diffuser to said first support plate by compressing against said upwardly extending annular rib of said first diffuser, and
   a second retaining ring mounted about said second diffuser body, wherein said second retaining ring secures said second diffuser to said second support plate by compressing against said upwardly extending annular rib of said second diffuser.

13. The diffuser assembly according to claim 12 wherein each of said peripheral shoulders on said support plates is L-shaped.

14. A system for aerating wastewater comprising:
   an air distribution pipe for supplying air,
   a plurality of diffuser assemblies adapted to diffuse air received from said distribution pipe into the wastewater, each of said diffuser assemblies is mounted along said air distribution pipe and includes;
      a first diffuser body in fluid communication with said distribution pipe,
      a second diffuser body in fluid communication with said distribution pipe,
      a first diffuser supported by said first diffuser body such that the air flows from said distribution pipe into said first diffuser body and through said first diffuser into the wastewater,
      a second diffuser supported by said second diffuser body such that the air flows from said distribution pipe into said second diffuser body and through said second diffuser into the wastewater, and
      a saddle connecting said first diffuser body and said second diffuser body to said distribution pipe, wherein said distribution pipe includes an outer surface and said saddle includes a contoured surface having a shape complementary to said outer surface on said distribution pipe such that said saddle mates with substantially half of said outer surface on said distribution pipe.

15. The system according to claim 14 wherein said saddle is integral with said first diffuser body and said second diffuser body.

16. The system according to claim 15 wherein said first diffuser body extends transversely from the distribution pipe.

17. The system according to claim 16 wherein said second diffuser body extends transversely from said distribution pipe.

18. The system according to claim 17 wherein said first diffuser body and said second diffuser body extend upwardly from said distribution pipe.

19. The system according to claim 14 wherein each of said diffuser assemblies further comprise a first retaining ring and a second retaining ring, said first diffuser is secured between said first diffuser body and said first retaining ring and said second diffuser is secured between said second diffuser body and said second retaining ring.

20. The system according to claim 14 wherein said first diffuser and said second diffuser are substantially horizontal such that the air flows substantially vertically as the air passes through each said diffuser.

21. The system according to claim 14 wherein said first and second diffusers are circular.

22. The system according to claim 21 wherein said half of said distribution pipe is an upper half of said distribution pipe.

23. The system according to claim 14 wherein each of said diffuser assemblies is mounted along said distribution pipe using a hollow rivet.

24. The system according to claim 14 further comprising a clamping member secured to said saddle, wherein said distribution pipe includes a lower-half and said clamping member is adapted to be contiguous with substantially said lower-half of said distribution pipe.

25. The system according to claim 24 further comprising an O-ring compressed between said saddle and said distribution pipe to prevent the air from leaking between said saddle and said distribution pipe.

* * * * *